(12) United States Patent
Hochwald et al.

(10) Patent No.: US 8,194,774 B2
(45) Date of Patent: Jun. 5, 2012

(54) METHOD OF A RECEIVER ESTIMATING A PLURALITY OF CHANNELS

(75) Inventors: Bertrand Hochwald, Santa Clara, CA (US); Robert G. Lorenz, Santa Clara, CA (US); Harold Artes, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 806 days.

(21) Appl. No.: 12/287,619

(22) Filed: Oct. 10, 2008

(65) Prior Publication Data

US 2009/0116575 A1    May 7, 2009

Related U.S. Application Data

(60) Provisional application No. 60/998,667, filed on Oct. 12, 2007.

(51) Int. Cl.
 *H04B 7/02* (2006.01)
 *H04L 1/02* (2006.01)

(52) U.S. Cl. ........ 375/267; 375/299; 375/347; 375/260; 375/346; 370/252; 370/382; 455/500; 455/101

(58) Field of Classification Search .......... 375/267, 375/260, 299, 346, 347, 349; 455/500, 101; 370/252, 328
See application file for complete search history.

(56) References Cited

U.S. PATENT DOCUMENTS

| | | | |
|---|---|---|---|
| 2005/0195763 A1* | 9/2005 | Kadous et al. | 370/328 |
| 2005/0276347 A1 | 12/2005 | Mujtaba et al. | |
| 2006/0126752 A1 | 6/2006 | Hansen et al. | |
| 2007/0047666 A1 | 3/2007 | Trachewsky | |
| 2007/0097946 A1 | 5/2007 | Mujtaba | |
| 2008/0298264 A1* | 12/2008 | Ramesh et al. | 370/252 |
| 2011/0200134 A1* | 8/2011 | Khan | 375/267 |

* cited by examiner

*Primary Examiner* — Phuong Phu

(74) *Attorney, Agent, or Firm* — Sterne, Kessler, Goldstein & Fox P.L.L.C.

(57) ABSTRACT

A method and apparatus of a receiver estimating a plurality of channels is disclosed. The method includes the receiver receiving a composite signal. The composite signal includes a signal from each of a plurality of transmission antennas, wherein the signal of each transmission antenna includes a delay relative to other signals of other antennas. The receiver estimates channels between the receiver and the plurality of transmission antennas based on amplitude and a phase of a received composite signal, at a plurality of frequencies.

15 Claims, 9 Drawing Sheets

The receiver receiving a composite signal, the composite signal comprising a signal from each of a plurality of transmission antennas, the signal of each transmission antenna comprising a delay relative to other signals of other antennas

710

The receiver estimating channels between the receiver and the plurality of transmission antennas based on an amplitude and a phase of a received composite signal at a plurality of frequencies

The receiver receiving a composite signal, the composite signal comprising a signal from each of a plurality of transmission antennas, the signal of each transmission antenna comprising a cyclic delay relative to other signals of other antennas

810

The receiver estimating channel tap delays between the receiver and the plurality of transmission antennas based on an amplitude and a phase of a received composite signal at a plurality of frequencies

METHOD OF A RECEIVER ESTIMATING A PLURALITY OF CHANNELS

CROSS-REFERENCE TO RELATED APPLICATION

This application claims the benefit of U.S. Provisional Application Patent Application No. 60/998,667 filed Oct. 12, 2007, and which is incorporated by reference in its entirety herein.

FIELD OF THE DESCRIBED EMBODIMENTS

The described embodiments relate generally to wireless communications. More particularly, the described embodiments relate to a method and system of a receiver estimating transmission channels based on reception of a plurality of delayed transmission signals.

BACKGROUND

Mobile WiMAX is a wireless platform being developed to provide wireless access that is able to deliver on demanding service requirements. With the added support for a variety of advanced multi-antenna implementations, Mobile WiMAX offers wireless access that meets growing network demands with higher performance, fewer sites, less spectrum, and reduced cost.

Multiple antenna techniques at the base station and end-user device, paired with sophisticated signal processing, can dramatically improve the communications link for the most demanding application scenarios including heavily obstructed propagation environments and high speed mobility service. Where conventional wireless network design has long used base site sectorization and single, omni-directional antennas at the end-user device to serve the communications link, with advanced multi-antenna implementations operators have a new techniques to develop the robust wireless networks.

Industry vendors and sources have created a host of naming conventions to refer to multi-antenna implementations. Simply put, the term MIMO (multiple input multiple output) can be used to reference any multi-antenna technologies. MIMO antenna systems are used in code division multiple access (CDMA) networks, time division multiplexing (TDM) networks, time division multiple access (TDMA) networks, orthogonal frequency division multiplexing (OFDM) networks, orthogonal frequency division multiple access (OFDMA) networks, and others. In order to maximize throughput, MIMO networks use a variety of channel estimation techniques to measure the transmission channel between a base stations of the wireless network and a mobile device. The channel estimation technique used depends on the wireless network type (i.e., CDMA, TDM/TDMA, OFDM/OFDMA).

Methods of estimating the transmission channels typically rely on pilots that occupy valuable time and frequency transmission space. That is, the typical methods require dedicated signaling overhead that requires bandwidth (time and/or frequency), and therefore, occupies system capacity.

Additionally, wireless networks that include mobile terminals (subscribers) have transmission channels that change frequently. Therefore, the transmission channels must be re-estimated or updated more frequently. As a result, wireless networks that include mobile terminals require even more capacity dedicated to channel estimations.

It is desirable to have a system and method for estimating and/or updating transmission channel information between a base station and a mobile terminal of a wireless network. It is desirable that the methods and apparatus not require additional overhead.

SUMMARY

An embodiment includes a method of a receiver estimating a plurality of channels. The method includes the receiver receiving a composite signal, the composite signal including a signal from each of a plurality of transmission antennas, and wherein the signal of each transmission antenna includes a delay relative to other signals of other antennas. The receiver estimates channels between the receiver and the plurality of transmission antennas based on an amplitude and a phase of a received composite signal at a plurality of frequencies.

Another embodiment includes a method of a receiver estimating tap delay profiles of a plurality of channels. The method includes the receiver receiving a composite signal, the composite signal including a signal from each of a plurality of transmission antennas, and wherein the signal of each transmission antenna includes a delay relative to other signals of other antennas. The receiver estimates channel tap delays between the receiver and the plurality of transmission antennas based on an amplitude and a phase of a received composite signal at a plurality of frequencies.

Another embodiment includes a method of base station transmission. The method includes the base station transmitting a signal from multiple antennas, wherein the signal of each transmission antenna comprises a cyclic delay relative to other signals of other antennas during a CDD zone of transmission. The base station transmits information regarding the cyclic delay. The base station transmits multiple signals from the multiple antennas outside of the CDD zone of transmission.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7 is a flow chart that shows steps of an example of a method of a receiver estimating a plurality of channels.

FIG. 8 shows a flow chart that includes steps of one example of a method of a receiver estimating tap delay profiles of a plurality of channels.

DETAILED DESCRIPTION

The described embodiments include methods and apparatuses for estimating and/or updating transmission channel information between a base station and a mobile terminal of a wireless network, based on multiple delayed signals received from multiple transmission antennas.

Fading of wireless communication signals can occur when the communications signals travel multiple different paths from a transmitter to a receiver. The fading can result when the communication signal of one path sums with the communication signal of another path.

Common approaches to combat fading include frequency diversity and space diversity. Multiple signals can be transmitted at different frequencies and/or space (antenna) locations. The redundancy provides can be used to alleviate the effects of fading.

Frequency diversity relies on the fact that the fading is typically different at different frequencies, and therefore, not correlated. A fade at one frequency may not occur at another frequency. In one example, a receiver measures a signal-to-noise ratio (SNR) at multiple frequencies, and automatically selects a receiver frequency that provides the best SNR at any instant in time.

Space diversity relies on the fact that fading is typically different at different transmission locations. Antennas spaced by multiples of transmission frequency wavelengths typically fade relatively independently. In one example, a receiver can select to receive from the transmit antenna that provides a transmission signal suffering the lesser amount of fading. In another example, the receiver combines the signals received from the multiple transmission antennas.

Figure 1:
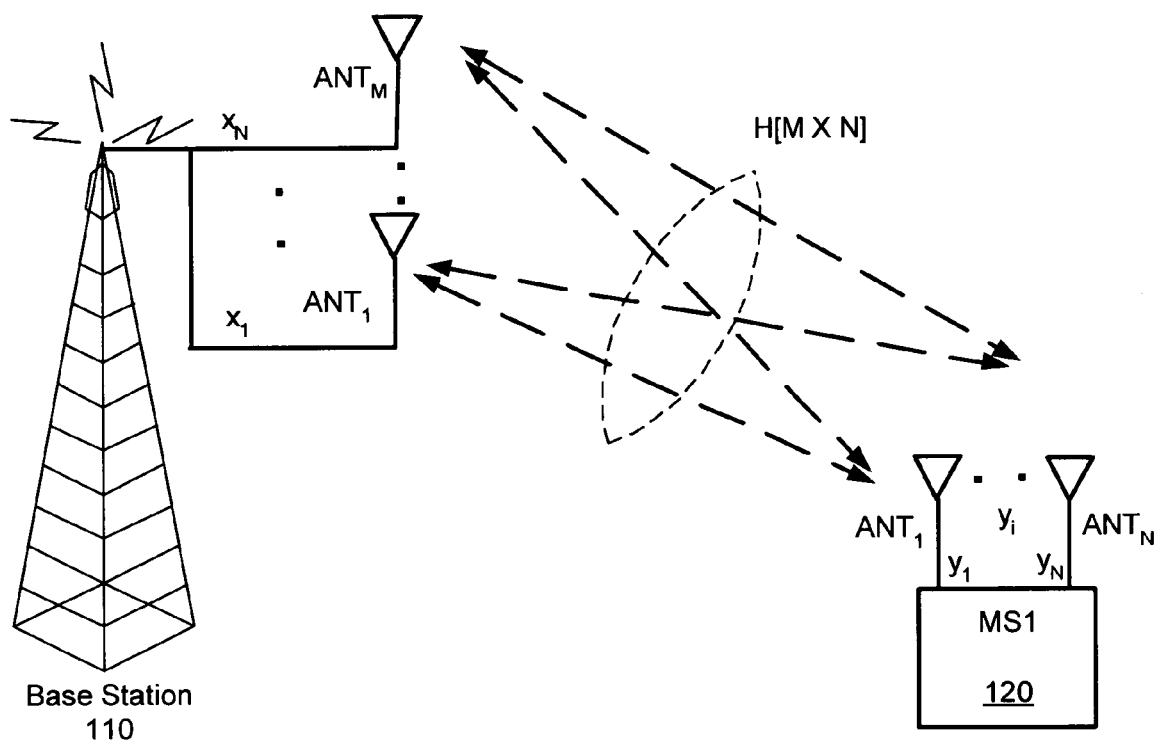
FIG. 1 shows an example of a base station transmitting multiple delayed signals to a receiver.

FIG. 1 shows an example of a base station transmitting multiple delayed signals to a receiver. The delay between each of the delayed signals of a multiple antenna base station can be a cyclic delay. More specifically, the cyclic delay can include cyclic delay diversity (CDD). CDD is a diversity method that is used, for example, in OFDM-based telecommunication systems, transforming spatial diversity into frequency diversity to minimize inter-symbol interference (ISI).

For another embodiment, the delay includes Cyclic Shift Transmit Diversity (CSTD). CSTD is an adaptation of the idea of delay diversity to OFDM systems. For a CSTD system, each antenna element in a transmit array transmits a circularly shifted version of the same OFDM time domain symbol. Note that each antenna adds a cyclic prefix after circularly shifting the OFDM symbol, and therefore the delay-spread mitigation offered by the cyclic prefix is unaffected by the CSTD.

As shown in FIG. 1, a multiple antenna base station 110 transmits signals to a user device 120. The base station 110 and the user device 120 can be a part of a wireless network, for example, a WiMAX wireless network. To capitalize on the performance advantages offered by MIMO wireless systems, the wireless network can include the previously described delay diversity.

In some systems, CDD is included for diversity purposes. However, in multiple antenna systems, the delay diversity provided by CDD can be used by the described embodiments to make, or at least aid estimations of transmission channels. The transmission channel estimations are useful in MIMO transmission or beamforming transmission.

Figure 2:
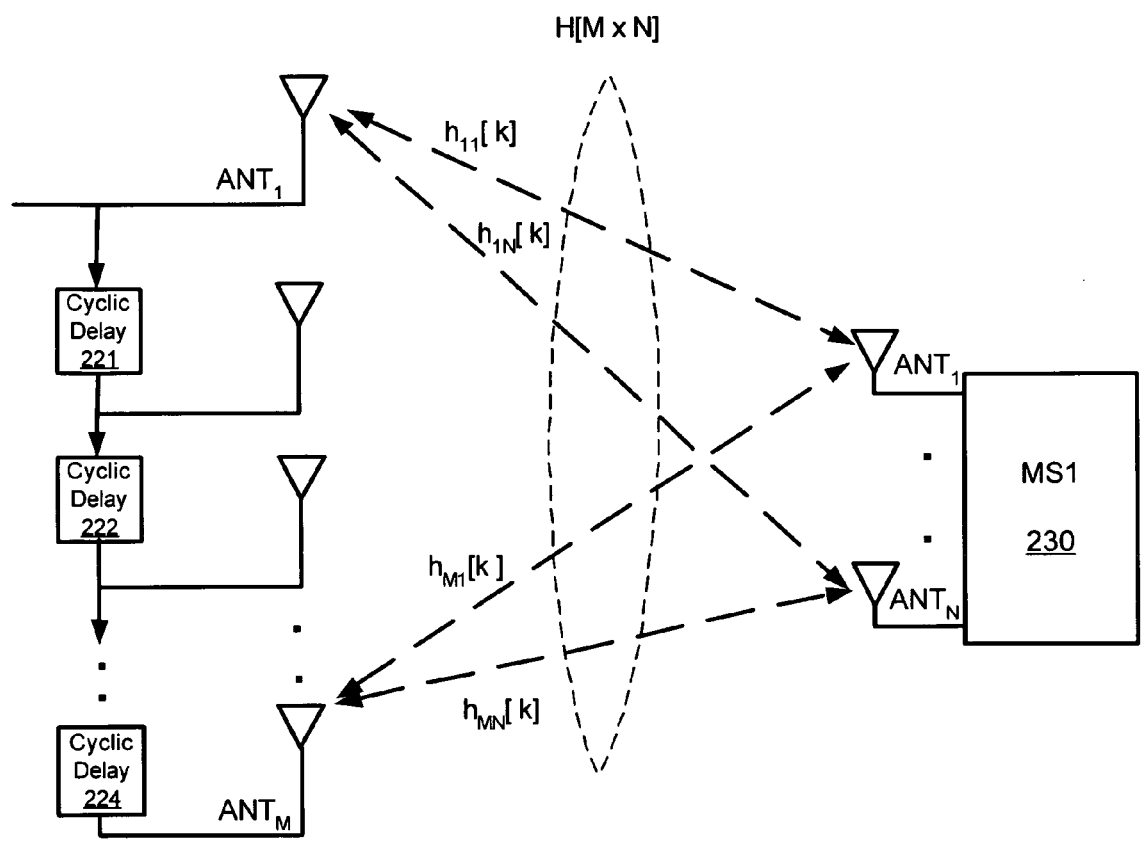
FIG. 2 shows another example of an embodiment of a base station transmitting multiple delayed signals to a receiver.

FIG. 2 shows another example of an embodiment of a base station transmitting multiple delayed signals to a receiver. As shown, a cyclic delay 221, 222, 224 is introduced by the base station (transmitter) between transmit signals of each of the M antennas. It is to be understood that each of the cyclic delays 221, 222, 224 is not an actual time delay between each of the transmit signals, but rather, a cyclic delay between the transmit signals.

The receiver (mobile subscriber) 230 receives multiple of the delayed signals. The receiver 230 of FIG. 2 includes multiple (N) antennas. However, a single antenna at the receiver 230 can receive a composite signal that includes the multiple signals received from multiple transmit antennas of the base station. The receiver can estimate channels (for example, the M×N channels of the channel of FIG. 2) between the receiver and the plurality of transmission antennas based on amplitude and phase of the received composite signal at a plurality of frequencies. The receiver can use knowledge of the cyclic delay to solve cyclic delay equations.

The delayed signals transmitted by the base station can each include multi-carrier signals, such as, OFDM (orthogonal frequency division multiplexed) signals. Multiple equations can be obtained by the receiver across multiple carriers. The multiple equations can be used to determine (solve for) multiple of the transmission channels.

The index k of the channels represents sub-carriers of multi-carriers signals. That is, for each antenna pair (transmit to receive) there are k sub-channels corresponding to each of k sub-carriers of the multi-carrier signals.

Figure 3:
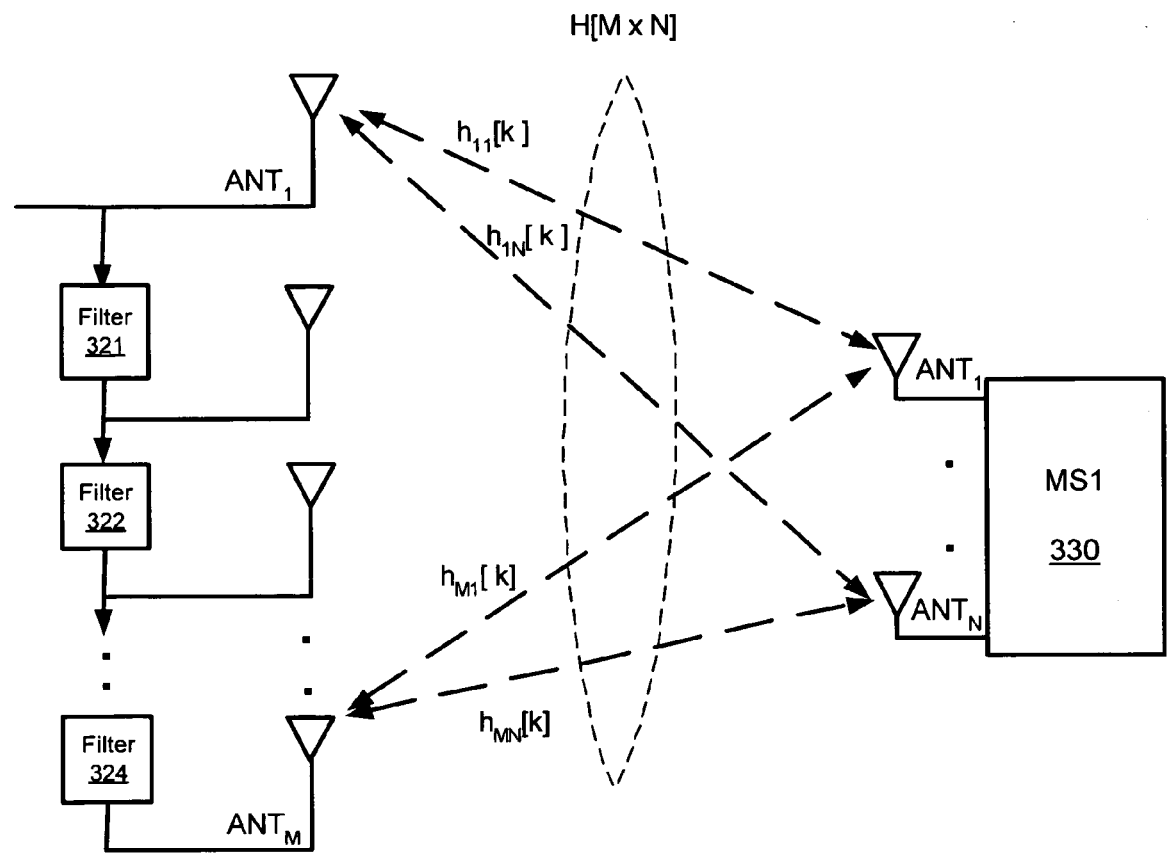
FIG. 3 shows another example of an embodiment of a base station transmitting multiple delayed signals to a receiver.

FIG. 3 shows another example of an embodiment of a base station transmitting multiple delayed signals to a receiver. For this embodiment, the delays are introduced through filters 321, 322, 324.

Figure 4A:
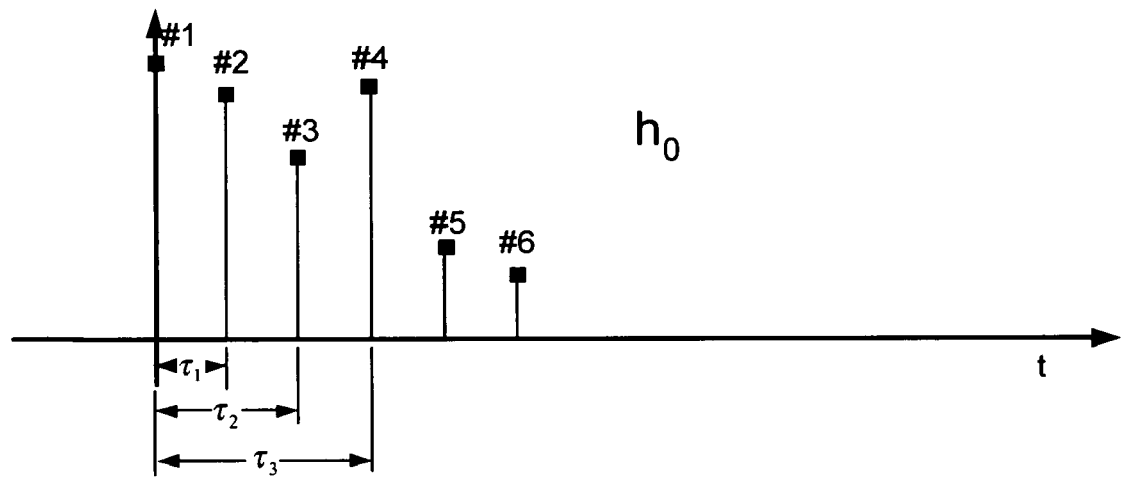
FIGS. 4A, 4B, 4C show different portions of an example of a power delay profile of a CDD signal received from a multiple antenna transmitter.
Figure 4B:
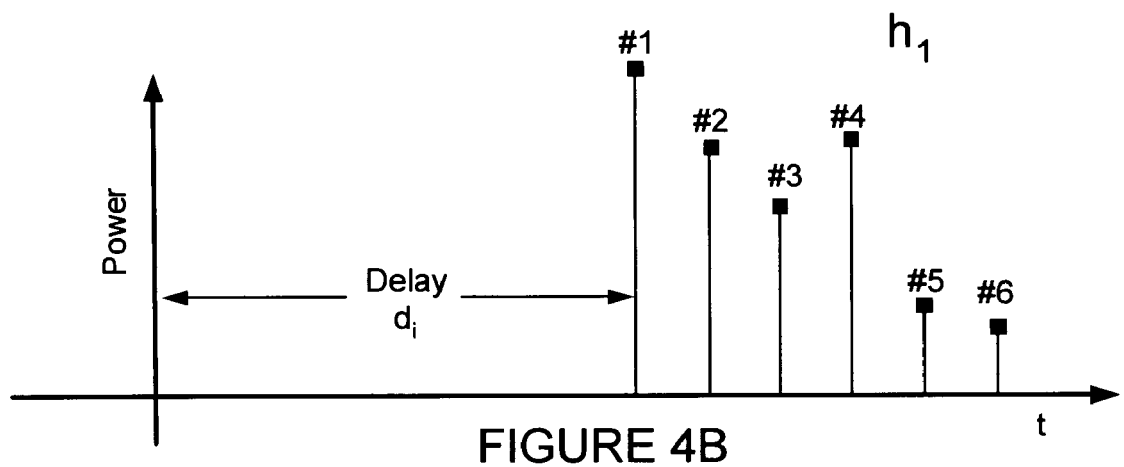
Figure 4C:
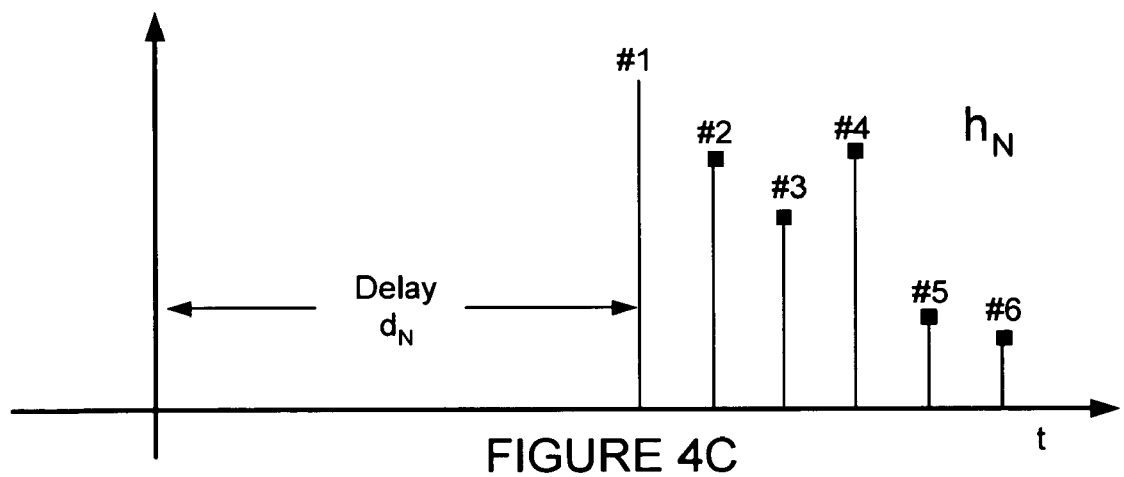

FIGS. 4A, 4B, 4C show different portions of an example of a power delay profile of a CDD signal received from a multiple antenna transmitter. Each of the power delay profiles of FIGS. 4A, 4B, 4C are shown separately. However, it is to be understood that the power delay profiles are generally computed at the receiver, and the power delay profile analyzed by the receiver is typically an accumulation of FIGS. 4A, 4B, 4C.

FIG. 4A shows a power delay profile for an exemplary $h_0$ channel. The times $\tau_1, \tau_2, \tau_3$ between taps of the power delay profile represent channel tap delays. The delays and amplitudes (the amplitudes provide representations of the power of the taps) of the taps provide a representation of the "natural" channel. The "natural" channel is, for example, the channel that transmission signals experience as the transmission signals travel from a base station to a subscriber terminal.

The delay (Delay) of FIGS. 4B and 4C represents the cyclic delay between the transmitted signals.

Figure 5:
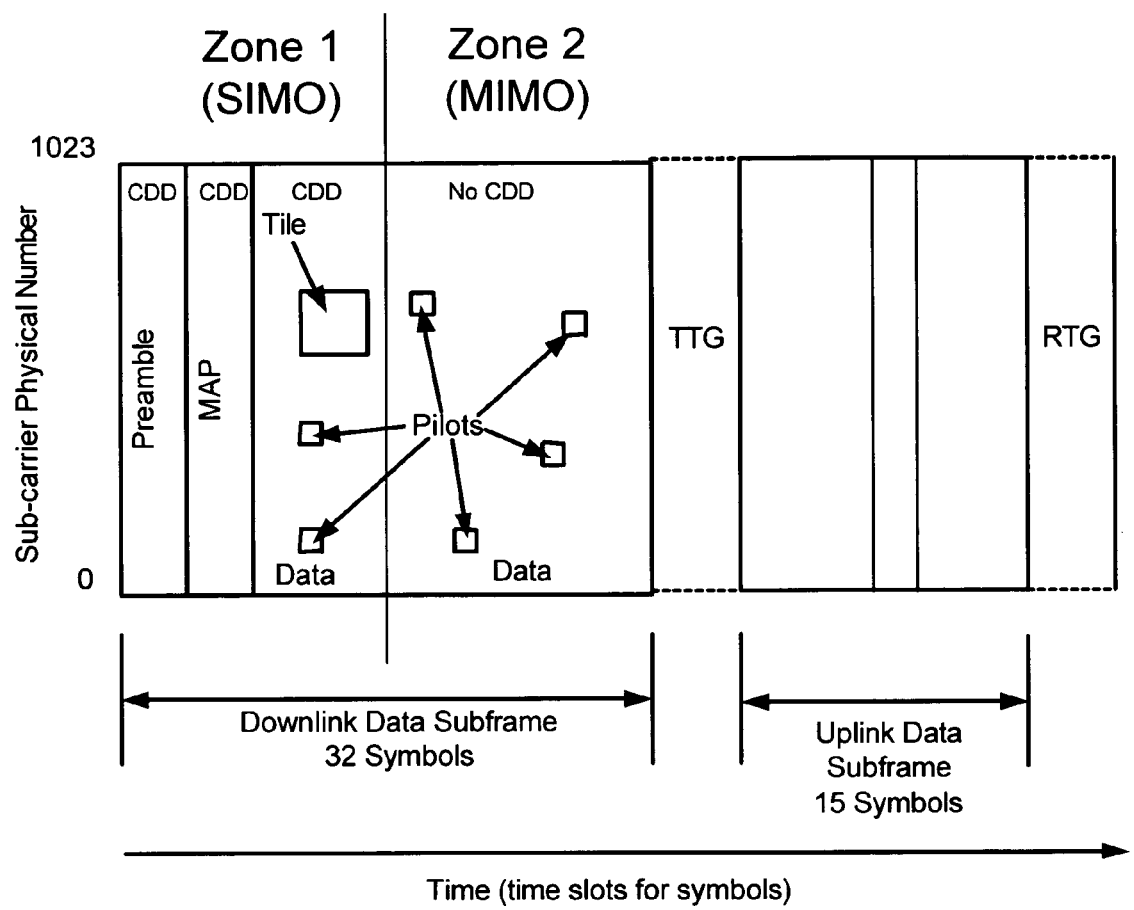
FIG. 5 shows an example of a downlink frame that includes CCD zones and other zones of transmission.

FIG. 5 shows an example of a downlink frame that includes CDD (cyclic delay diversity) zones and other zones of transmission. More specifically, the exemplary downlink frame shown is a WiMAX downlink frame that includes a preamble, a MAP, and at least a portion of a data that are a part of a zone in which the base station is employing CDD, indicated as Zone 1. A second zone, indicated as Zone 2, does not employ CDD.

For a specific WiMAX embodiment, Zone 1 is designated as a SIMO (single input, multiple output) zone, suggesting a single transmit antenna and multiple receive antennas. In reality, the transmitter has multiple transmit antennas, but the signal received by the receiver "appears" to have been transmitted by a single "virtual" antenna. Zone 2 is designated as a MIMO (multiple input, multiple output) zone, suggesting multiple transmit antennas and multiple receive antennas.

Guards TTG, RTG can be include between downlink and uplink sub-frames. An exemplary downlink sub-frame includes 32 multi-carrier symbols and an exemplary uplink sub-frame includes 15 multi-carrier symbols. Exemplary multi-carrier symbols include 1023 sub-carriers.

The CDD zone occurs before the non-CDD zone. Therefore, channel estimations made during the CDD zone can be utilized during the later-occurring non-CDD zone. The MIMO transmission during the non-CDD zone can utilize the channel estimations for MIMO communications, or for uplink beam-forming transmission.

Figure 6:
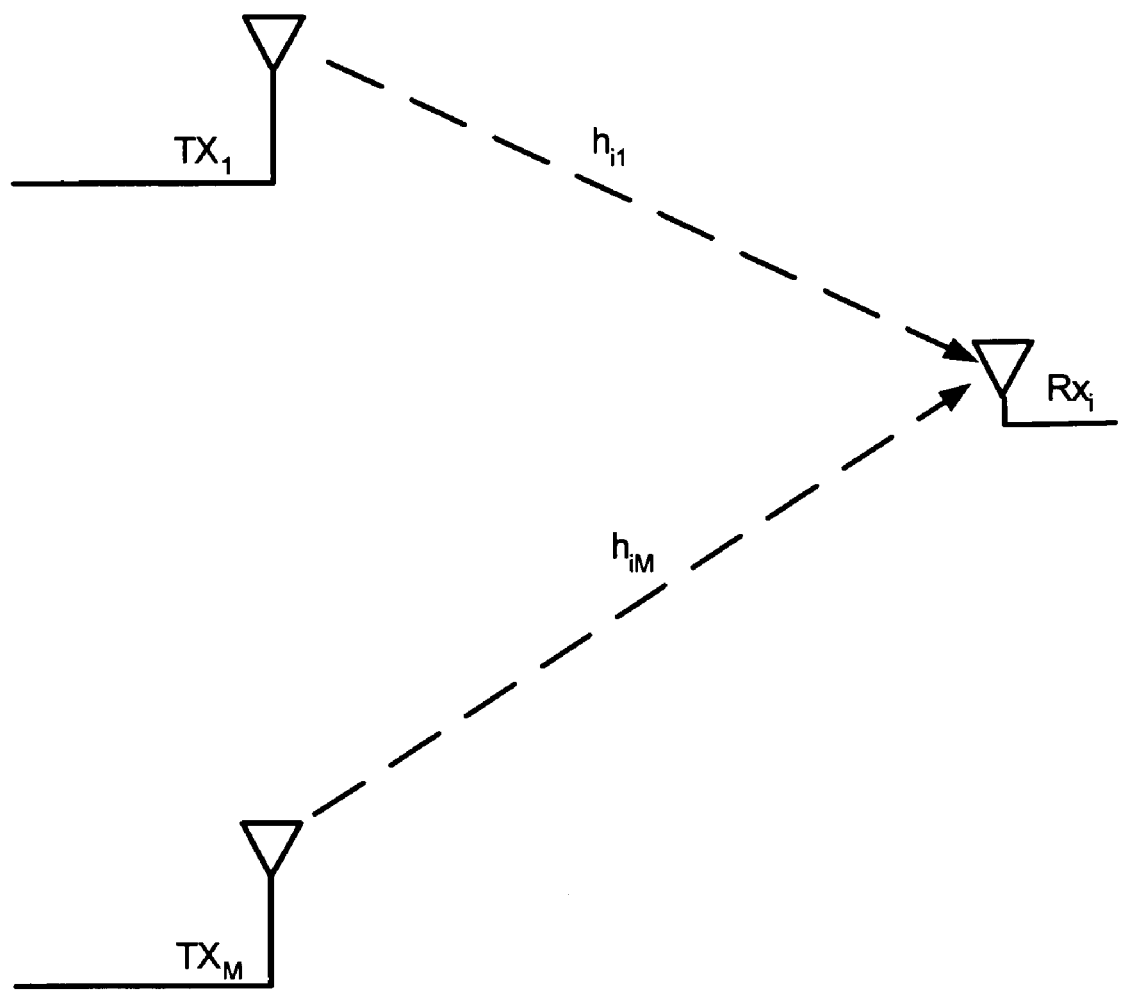
FIG. 6 shows a generalized example of multiple transmission antennas, multiple transmission channels, and at least one receive antenna.

FIG. 6 shows a generalized example of multiple transmission antennas, multiple transmission channels, and at least one receive antenna. For a specific exemplary embodiment, the number of M transmit antennas is 2, and the number of N receive antennas is 1. For this embodiment, signals transmitted from the second of the two transmit antennas is cyclically delayed with respect to the first transmit antenna by $d_2$. A signal received at an ith (note, i=1 for a single antenna) receive antenna can be represented as:

$$yi = h_{1i} + h_{2i}e^{-j\frac{2\pi d_2 k}{N_{fft}}}$$

Assuming, for example, that $h_{1i}$ and $h_{2i}$ are not functions of k, that is, the transmission channel is flat, then for sub-carrier k=0;

$$y_{ki} = h_{1i} + h_{2i}.$$

For sub-carrier $k=(N_{fft})/(2d_2)$;

$$Y_{ki} = h_{1i} + h_{2i}e^{-j\pi} = h_{1i} - h_{2i}.$$

The two unknowns $h_{1i}$, $h_{2i}$ can easily be solved for using the two equations for $y_{1k}$.

A general equation can be provided for estimating received multi-carrier signals that are transmitted by the multiple (M at least 2) transmission antennas, wherein delayed taps have different amplitudes $\alpha_2, \ldots \alpha_M$ corresponding to tap delays $d_2, \ldots d_M$. A signal received by an ith receiver antenna can be estimated by:

$$y_{ki} = p_k \left[ h_{1i} + h_{2i}\alpha_2 e^{-j\frac{2\pi d_2 k}{N_{fft}}} + \ldots + h_{Mi}\alpha_M e^{-j\frac{2\pi d_M k}{N_{fft}}} \right] + w_{ki},$$

where k is a sub-carrier index, $p_k$ is the k-th preamble pilot sub-carrier, $N_{fft}$ is an FFT size, $h_{Mi}$ is a transmission channel, and $w_{ki}$ is additive noise. It is assumed that the channel is not frequency-selective, and therefore, h is not a function of k.

If, for example, $N_{fft}=1024$, a matrix representation of the preamble (every third carrier active) of the received signal at the ith receiver antenna is (sub-carriers k>849 are assumed to be "guard" sub-carriers):

$$\begin{bmatrix} p_0 y_{0i} \\ p_3 y_{3i} \\ \vdots \\ p_{849} y_{849i} \end{bmatrix} = \begin{bmatrix} 1 & 1 & \ldots & 1 \\ 1 & \alpha_2 e^{-j\frac{2\pi d_2 3}{1024}} & \ldots & \alpha_M e^{-j\frac{2\pi d_M 3}{1024}} \\ 1 & \alpha_2 e^{-j\frac{2\pi d_2 6}{1024}} & & \alpha_M e^{-j\frac{2\pi d_M 6}{1024}} \\ \vdots & & & \vdots \\ 1 & \alpha_2 e^{-j\frac{2\pi d_2 849}{1024}} & \ldots & \alpha_M e^{-j\frac{2\pi d_M 849}{1024}} \end{bmatrix} \times \begin{bmatrix} h_{1i} \\ h_{2i} \\ \vdots \\ h_{Mi} \end{bmatrix} + \begin{bmatrix} w_{0i} \\ w_{3i} \\ \vdots \\ w_{849i} \end{bmatrix}$$

More generally, for all receiver antennas:

$$\begin{bmatrix} p_0 y_{0,1} & \ldots & p_0 y_{0,N} \\ p_0 y_{3,1} & & p_0 y_{3,N} \\ \vdots & & \vdots \\ p_{849} y_{849,1} & \ldots & p_{849} y_{849,N} \end{bmatrix} = \begin{bmatrix} 1 & 1 & \ldots & 1 \\ 1 & \alpha_2 e^{-j\frac{2\pi d_2 3}{N_{fft}}} & \ldots & \alpha_M e^{-j\frac{2\pi d_M 3}{N_{fft}}} \\ 1 & \alpha_2 e^{-j\frac{2\pi d_2 6}{N_{fft}}} & & \alpha_M e^{-j\frac{2\pi d_M 6}{N_{fft}}} \\ \vdots & & & \vdots \\ 1 & \alpha_2 e^{-j\frac{2\pi d_2 849}{N_{fft}}} & \ldots & \alpha_M e^{-j\frac{2\pi d_M 849}{N_{fft}}} \end{bmatrix} \times$$

$$\begin{bmatrix} h_{11} & \ldots & h_{N1} \\ \vdots & & \vdots \\ h_{M1} & \ldots & h_{MN} \end{bmatrix} + \begin{bmatrix} w_{0,1} & \ldots & w_{0,N} \\ w_{3,1} & \ldots & w_{3,n} \\ \vdots & & \vdots \\ w_{849,1} & \ldots & w_{849,N} \end{bmatrix}$$

Which can be depicted more compactly as:

$$Y_{284 \times N} = A_{284 \times M} \cdot H_{M \times N} + W_{284 \times N}$$

Having an MMSE estimation of:

$$\hat{H} = (A^*A + \sigma_2 I)^{-1} A^* Y, \text{ where } \sigma^2 \text{ is a noise variance.}$$

For a frequency selective channel (note the superscripts represent an order of tap delay);

$$h_{1i}[k] = h_{1i}^{(1)} + h_{1i}^{(2)} e^{-j\frac{2\pi \tau_2 k}{N_{fft}}} + \ldots + h_{1i}^{(L)} e^{-j\frac{2\pi \tau_L k}{N_{fft}}}$$

$$\vdots$$

$$h_{Mi}[k] = h_{Mi}^{(1)} + h_{Mi}^{(2)} e^{-j\frac{2\pi \tau_2 k}{N_{fft}}} + \ldots + h_{Mi}^{(L)} e^{-j\frac{2\pi \tau_L k}{N_{fft}}}$$

For the i-th receiver antenna (again, note the superscripts represent an order of tap delay 1 . . . L):

$$\begin{bmatrix} p_0 y_{0i} \\ p_3 y_{3i} \\ \vdots \\ p_{849} y_{849i} \end{bmatrix} = [A \ D_2 A \ D_3 A \ \ldots \ D_L A] \times \begin{bmatrix} h_{1i}^{(1)} \\ \vdots \\ h_{Mi}^{(1)} \\ h_{1i}^{(2)} \\ \vdots \\ h_{Mi}^{(2)} \\ \vdots \\ h_{1i}^{(L)} \\ \vdots \\ h_{Mi}^{(L)} \end{bmatrix} + W_{284 \times 1}$$

where, $$D_l \equiv \begin{bmatrix} 1 & 0 & \ldots & \ldots & 0 \\ 0 & e^{-j2\pi \tau_l 3} & \ldots & & \vdots \\ \vdots & & e^{-j\frac{2\pi \tau_l 6}{N_{fft}}} & \ldots & \vdots \\ \vdots & & \ldots & \ldots & 0 \\ 0 & \ldots & \ldots & 0 & e^{-j\frac{2\pi \tau_l 849}{N_{fft}}} \end{bmatrix}$$

For all receiver antennas;

$$Y_{284 \times N} = [A\ D_2A\ D_3A \ldots D_LA] \times \tilde{H}_{ML \times N} + W_{284 \times N}$$

in which the i-th column of $$\tilde{H}_{ML \times N}$$

is:
$$\begin{bmatrix} h_{1i}^{(1)} \\ \vdots \\ h_{Mi}^{(1)} \\ h_{1i}^{(2)} \\ \vdots \\ h_{Mi}^{(2)} \\ \vdots \\ h_{1i}^{(L)} \\ \vdots \\ h_{Mi}^{(L)} \end{bmatrix} \text{ for } i = 1, 2, \ldots, N.$$

Which can be represented more compactly by:

$$Y_{284 \times N} = \tilde{A}_{284 \times ML} \cdot \tilde{H}_{ML \times N} + W_{284 \times N}$$

Wherein the MSSE estimation is:

$$\hat{\tilde{H}} = (\tilde{A}^*\tilde{A} + \sigma^2 I)^{-1} \tilde{A}^* Y \text{ wherein } \sigma^2 \text{ is noise variance.}$$

FIG. 7 is a flow chart that shows steps of an example of a method of a receiver estimating a plurality of channels. A first step 710 includes the receiver receiving a composite signal, the composite signal including a signal from each of a plurality of transmission antennas, the signal of each transmission antenna including a delay relative to other signals of other antennas. A second step 720 includes the receiver estimating channels between the receiver and the plurality of transmission antennas based on an amplitude and a phase of a received composite signal at a plurality of frequencies.

For an embodiment, the delay comprises a cyclic delay. For more specific embodiments, the cyclic delay includes a cyclic diversity delay (CDD) or a cyclic space/time delay (CSTD).

For an embodiment, the transmission signal of each transmission antenna additionally includes an amplitude variation relative to other signals of other antennas. During transmission from the transmitter to the receiver, the transmission signals can travel through multiple transmission paths. Therefore, the received signal can suffer from multi-path, and experience "deep" nulls in its frequency response. In some situations it can be advantageous to introduce amplitude variations in the transmitted signal to help minimize the depth of the nulls.

For embodiments, the transmission signals of the multiple transmission signals are multi-carrier signals. For a specific embodiment, the multi-carrier signals are OFDM signals.

An embodiment includes the receiver using channel tap delays to estimate the channels. As previously described, a power delay profile can be used to identify the channel tap delays, and the channel tap delays ($\tau_i$'s) can be useful in estimating the transmission channels. The channel tap delays can be particularly useful because the channel tap delays can be used to allow the receiver to identify the frequency selectivity of the channel itself (native) versus frequency selectivity introduced by the CDD.

For an embodiment, the channel delay taps are estimated by recognizing repetition of power delay profiles associated with individual channels ($h_i$). The delay introduced through, for example, CDD, causes each signal from each transmit antenna to have a power delay profile that is a delayed repetition of other of the transmit signals.

For an embodiment, the base station (that is, the base station that introduces the delays between the transmit signal) additionally includes information about the delay within the transmitted signals. For embodiments, the information includes information about the delay, and can additionally include amplitude variation information. The delay information of, for example, a cyclic delay, can include the previously described $d_i$s.

As previously shown and described, an embodiment includes the received signals being transmitted with cyclic delays during a CDD zone of transmission, and the channel estimates are used to improve signal reception of signals received outside of the CDD zone. Basically, the channel estimates determined during CDD transmission are utilized at a time in which CDD transmission is not occurring. One implication may be that the CDD channel estimates are made frequent enough that the channel estimates are still useful.

One specific embodiment includes the receive signal being WiMAX signals. Embodiments of the frames of the WiMAX signals include the CDD zone, wherein the CDD zone includes at least a preamble, a MAP and/or data. The WiMAX frames can additionally include portions outside of the CDD that include data.

Various methods can be used to estimate the channel responses. For one embodiment, the channels are estimated by assuming a flat channel response, and solving equations for the channel response based on knowledge of cyclic delay using pilot measurements at a plurality of sub-carriers of the OFDM signals. That is, as previously shown and described, multiple equations that include multiple channels can be derived based on the received composite signal.

For an embodiment, the channel response is assumed flat if a detected amplitude variation between consecutive pilots of an OFDM symbol is less than a threshold.

Once the channel estimations have been either determined, or at least augmented, the estimated channels can be used by the receiver when transmitting uplink beamformed signals. That is, characteristics of the uplink beamformed signals can be selected based upon the estimated channels.

FIG. 8 shows a flow chart that includes steps of one example of a method of a receiver estimating tap delay profiles of a plurality of channels. A first step 810 includes the receiver receiving a composite signal, wherein the composite signal includes a signal from each of a plurality of transmission antennas, and the signal of each transmission antenna includes a cyclic delay relative to other signals of other antennas. A second step 820 includes the receiver estimating channel tap delays between the receiver and the plurality of transmission antennas based on an amplitude and a phase of a received composite signal at a plurality of frequencies.

An embodiment includes the channel delay taps being estimated by recognizing repetition of power delay profiles associated with individual channels ($h_i$).

Figure 9:
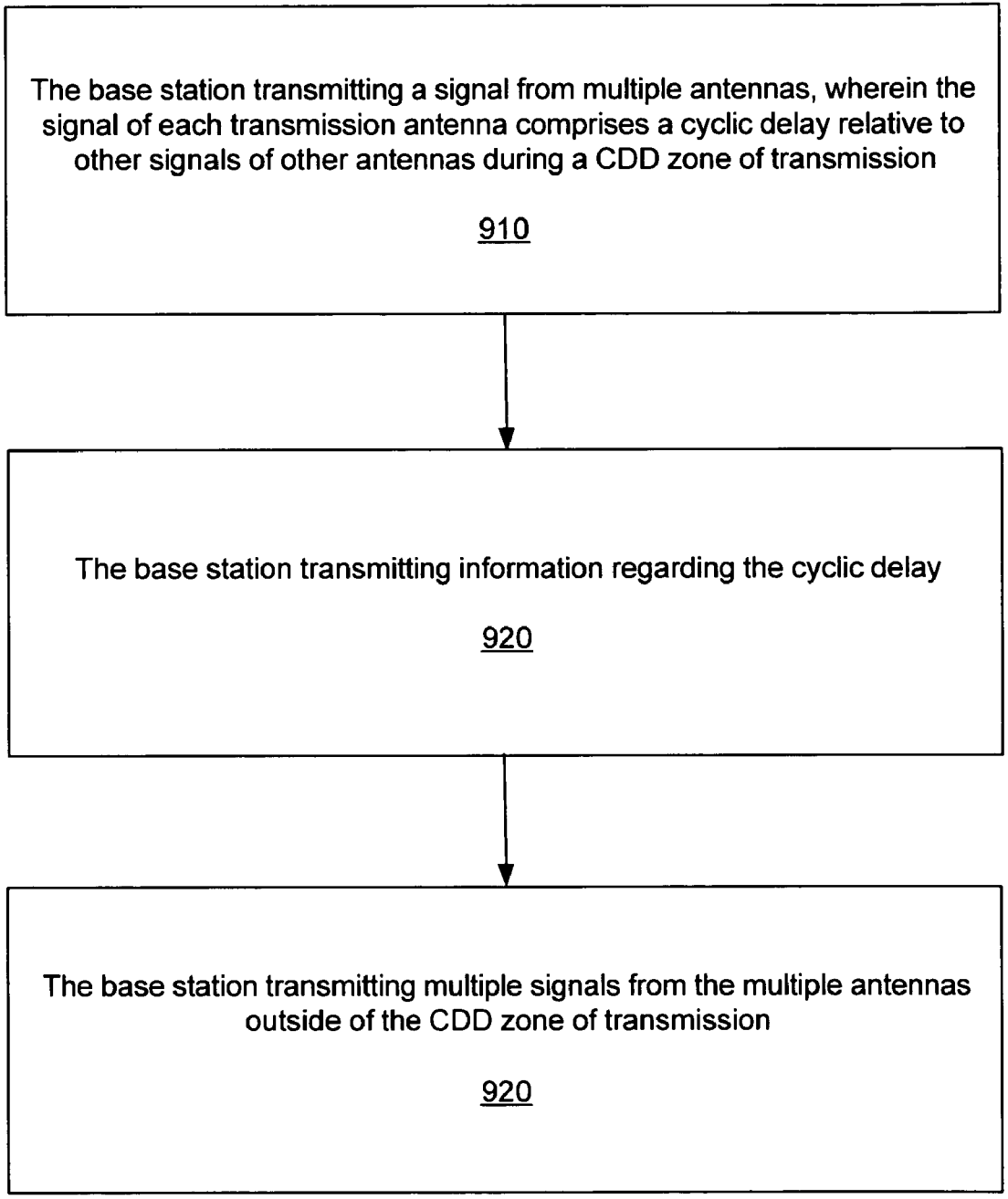
FIG. 9 shows a flow chart that includes steps of one example of a method of base station transmission.

FIG. 9 shows a flow chart that includes steps of one example of a method of base station transmission. A first step 910 includes the base station transmitting a signal from multiple antennas, wherein the signal of each transmission antenna includes a cyclic delay relative to other signals of other antennas during a CDD zone of transmission. A second step 920 includes the base station transmitting information regarding the cyclic delay. A third step 930 includes the base station transmitting multiple signals from the multiple antennas outside of the CDD zone of transmission.

Although specific embodiments of the invention have been described and illustrated, the invention is not to be limited to the specific forms or arrangements of parts so described and illustrated. The invention is limited only by the appended claims.

What is claimed:

1. A method for estimating a plurality of channels at a receiver, comprising:
    receiving a composite signal comprising a signal sent from each of a plurality of transmission antennas, the signal sent from each of the plurality of transmission antennas comprising a cyclic delay relative to the signal sent from other ones of the plurality of transmission antennas; and
    estimating channels between the receiver and the plurality of transmission antennas based on an amplitude and a phase of the composite signal at a plurality of frequencies,
    wherein the signal sent from each of the plurality of transmission antennas comprises the cyclic delay during an entirety of a preamble of a downlink frame, an entirety of a MAP of the downlink frame, and only a portion of a data part of the downlink frame.

2. The method of claim 1, wherein the cyclic delay comprises at least one of Cyclic Delay Diversity (CDD) and Cyclic Shift Transmit Diversity CSTD.

3. The method of claim 1, wherein the signal sent from each of the plurality of transmission antennas additionally comprises an amplitude variation relative to the signal sent from the other ones of the plurality of transmission antennas.

4. The method of claim 1, wherein the signal sent from each of the plurality of transmission antennas is an OFDM signal.

5. The method of claim 1, wherein estimating the channels between the receiver and the plurality of transmission antennas further comprise:
    using channel tap delays to estimate the channels.

6. The method of claim 5, further comprising:
    estimating the channel tap delays by recognizing repetition of power delay profiles associated with the channels.

7. The method of claim 1, further comprising:
    receiving information regarding the cyclic delay of the signal sent from each of the plurality of transmission antennas relative to the signal sent from the other ones of the plurality of transmission antennas.

8. The method of claim 7, wherein the information further comprises amplitude variation of the signal sent from each of the plurality of transmission antennas.

9. The method of claim 1, further comprising:
    using the channel estimates to improve signal reception of signals sent from the plurality of transmission antennas received outside of the preamble of the downlink frame, the MAP of the downlink frame, and the portion of the data part of the downlink frame.

10. The method of claim 1, further comprising:
    transmitting uplink beamformed signals, wherein characteristics of the uplink beamformed signals are selected based upon the estimated channels.

11. The method of claim 4, wherein the channels are estimated by assuming a flat channel response, and solving equations for the channel response based on knowledge of cyclic delay using pilot measurements at a plurality of sub-carriers of the OFDM signals.

12. The method of claim 11, wherein the channel response is assumed flat if a detected amplitude variation between consecutive pilots of an OFDM symbol is less than a threshold.

13. A method for estimating tap delay profiles of a plurality of channels, comprising:
    receiving a composite signal comprising a signal sent from each of a plurality of transmission antennas, the signal sent from each of the plurality of transmission antennas comprising a cyclic delay relative to the signal sent from other ones of the plurality of transmission antennas; and
    estimating channel tap delays between the receiver and the plurality of transmission antennas based on an amplitude and a phase of the composite signal at a plurality of frequencies,
    wherein the signal sent from each of the plurality of transmission antennas comprises the cyclic delay during an entirety of a preamble of a downlink frame, an entirety of a MAP of the downlink frame, and only a portion of a data part of the downlink frame.

14. The method of claim 13, further comprising:
    estimating the channel tap delays by recognizing repetition of power delay profiles associated with the channels.

15. The method of claim 13, further comprising:
    using the channel tap delays to improve signal reception of signals sent from the plurality of transmission antennas received outside the preamble of the downlink frame, the MAP of the downlink frame, and the portion of the data part of the downlink frame.

* * * * *